United States Patent
Magilton

(10) Patent No.: US 11,731,712 B2
(45) Date of Patent: Aug. 22, 2023

(54) EMERGENCY TRAILER RELEASE DEVICE

(71) Applicant: Michael Magilton, Walnut Grove, CA (US)

(72) Inventor: Michael Magilton, Walnut Grove, CA (US)

( * ) Notice: Subject to any disclaimer, the term of this patent is extended or adjusted under 35 U.S.C. 154(b) by 160 days.

(21) Appl. No.: 17/325,271

(22) Filed: May 20, 2021

(65) Prior Publication Data

US 2022/0371671 A1 Nov. 24, 2022

(51) Int. Cl.
*B62D 53/08* (2006.01)

(52) U.S. Cl.
CPC .................. *B62D 53/08* (2013.01)

(58) Field of Classification Search
CPC .... B62D 49/08; B62D 53/08; B62D 53/0842; B62D 53/085; B62D 53/0871; B62D 53/12; B60W 30/04
USPC ...................... 280/432, 433, 446.1, 449, 452
See application file for complete search history.

(56) References Cited

U.S. PATENT DOCUMENTS

| | | | |
|---|---|---|---|
| 2,471,854 A * | 5/1949 | Bies ........................ | B62D 53/10 280/433 |
| 2,815,224 A | 12/1957 | Waters | |
| 3,697,974 A * | 10/1972 | Harris ..................... | B62D 53/12 340/687 |
| 3,941,408 A * | 3/1976 | Petersson .............. | B60Q 1/305 280/421 |
| 4,269,426 A | 5/1981 | Bhushan | |
| 4,928,987 A * | 5/1990 | Hunger ................... | B62D 53/12 280/433 |
| 5,028,067 A * | 7/1991 | Madura .................. | B62D 53/12 280/433 |
| 5,069,472 A * | 12/1991 | Parr ....................... | B62D 53/12 280/433 |
| 5,176,396 A * | 1/1993 | Hawthorne ............. | B62D 53/10 280/437 |
| 5,456,484 A * | 10/1995 | Fontaine ................ | B62D 53/12 280/434 |
| 5,477,207 A * | 12/1995 | Frame, Sr. ............. | B62D 53/08 340/425.5 |
| 5,516,138 A * | 5/1996 | Fontaine ................ | B62D 53/12 280/434 |
| 5,625,335 A * | 4/1997 | Kelly ..................... | B62D 53/12 410/64 |
| 6,145,864 A | 11/2000 | Sutherland | |
| 6,285,278 B1 | 9/2001 | Schutt | |

(Continued)

*Primary Examiner* — Kevin Hurley
*Assistant Examiner* — Maurice L Williams

(57) ABSTRACT

An emergency trailer release device for separating a trailer from a towing truck during an emergency situation includes an actuating module and a controller, which are mountable to a fifth wheel and within a cab of the towing truck, respectively. The actuating module is operationally engaged to and can selectively open a set of locks so that a king pin engaging the trailer to the fifth wheel is released. The controller is operationally engaged to the actuating module and can be engaged an electrical circuit of the towing truck. The controller can be selectively actuated by a driver of the towing truck in an emergency situation to signal the actuating module to open the set of locks to disengage the trailer from the towing truck, for example, when the driver believes the towing truck, the trailer, or both, are in danger of rolling over.

15 Claims, 3 Drawing Sheets

(56) References Cited

U.S. PATENT DOCUMENTS

| | | | | |
|---|---|---|---|---|
| 6,402,176 | B1* | 6/2002 | Timmings | B62D 53/08 |
| | | | | 280/433 |
| 6,709,001 | B1* | 3/2004 | Morgan | B60D 1/62 |
| | | | | 280/421 |
| 7,182,362 | B2* | 2/2007 | Yeakel | B62D 53/12 |
| | | | | 280/433 |
| 7,731,216 | B2 | 6/2010 | Cornish | |
| 8,371,600 | B2* | 2/2013 | Buttner | B62D 53/08 |
| | | | | 280/433 |
| 8,615,347 | B2* | 12/2013 | Alguera Gallego | B62D 53/085 |
| | | | | 280/433 |
| D749,994 | S | 2/2016 | Verboeket | |
| 9,302,557 | B2* | 4/2016 | Alldredge | B62D 53/10 |
| 9,327,782 | B2* | 5/2016 | Alldredge | B62D 53/08 |
| 9,738,333 | B2* | 8/2017 | Alldredge | B62D 53/0885 |
| 10,661,622 | B2* | 5/2020 | Keatley | F04B 35/04 |
| 10,676,142 | B2* | 6/2020 | Hungerink | F15B 15/06 |
| 11,124,031 | B2* | 9/2021 | Wolfe | B60D 1/015 |
| 2002/0125684 | A1* | 9/2002 | Laarman | B62D 53/08 |
| | | | | 280/433 |
| 2007/0209879 | A1* | 9/2007 | Schmidt | B62D 53/0885 |
| | | | | 184/6.19 |
| 2019/0299732 | A1 | 10/2019 | Smith | |
| 2019/0329612 | A1* | 10/2019 | Gaufin | B62D 53/10 |

* cited by examiner

EMERGENCY TRAILER RELEASE DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to trailer release devices and more particularly pertains to a new trailer release device for separating a trailer from a towing truck during an emergency situation. The present invention discloses a trailer release device comprising an actuating module mountable to a fifth wheel and operationally engaged to a controller mountable within a cab of a towing truck, wherein a driver of the towing truck can utilize the controller to signal the actuating module to separate a trailer from the fifth wheel during an emergency situation.

(2) Description of Related Art Including Information Disclosed Under 37 CFR 1.97 and 1.98

The prior art relates to trailer release devices. Prior art trailer release devices may comprise hitches designed to disengage when a trailer achieves a specified annular relationship relative to an associated towing truck, sensor linked linear actuators or pneumatic cylinders for disengaging pins used to connect trailers to towing trucks, and sensing assemblies for assuring proper hitching of trailers to towing trucks. What is lacking in the prior art is a trailer release device comprising an actuating module mountable to a fifth wheel and operationally engaged to a controller mountable within a cab of a towing truck, wherein a driver of the towing truck can utilize the controller to signal the actuating module to separate a trailer from the fifth wheel during an emergency situation.

BRIEF SUMMARY OF THE INVENTION

An embodiment of the disclosure meets the needs presented above by generally comprising an actuating module and a controller configured to be mountable to a fifth wheel and within a cab of a towing truck, respectively. The actuating module is operationally engaged to a set of locks of the fifth wheel and thus is configured to selectively open the set of locks so that a king pin of a trailer engaged to the fifth wheel by the set of locks is released.

The controller is operationally engaged to the actuating module and is configured to operationally engage an electrical circuit of the towing truck. The controller is configured to be selectively actuated by a driver of the towing truck in an emergency situation. The controller is positioned to signal the actuating module to open the set of locks to disengage the trailer from the towing truck, for example, when the driver believes the towing truck, the trailer, or both, are in danger of rolling over, or when the driver believes the towing truck and trailer may jackknife.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
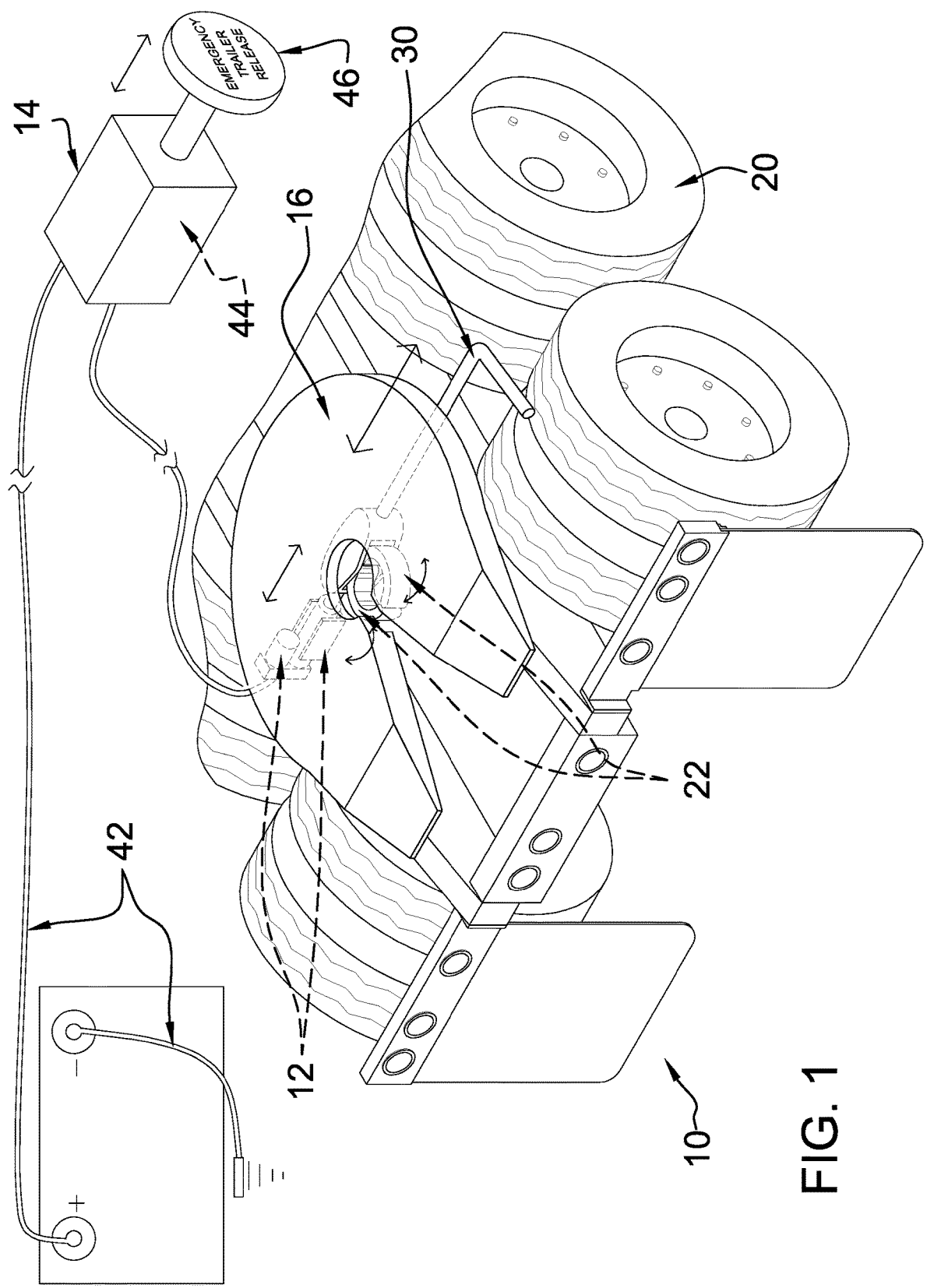
FIG. 1 is an isometric perspective view of an emergency trailer release device according to an embodiment of the disclosure.
Figure 2:
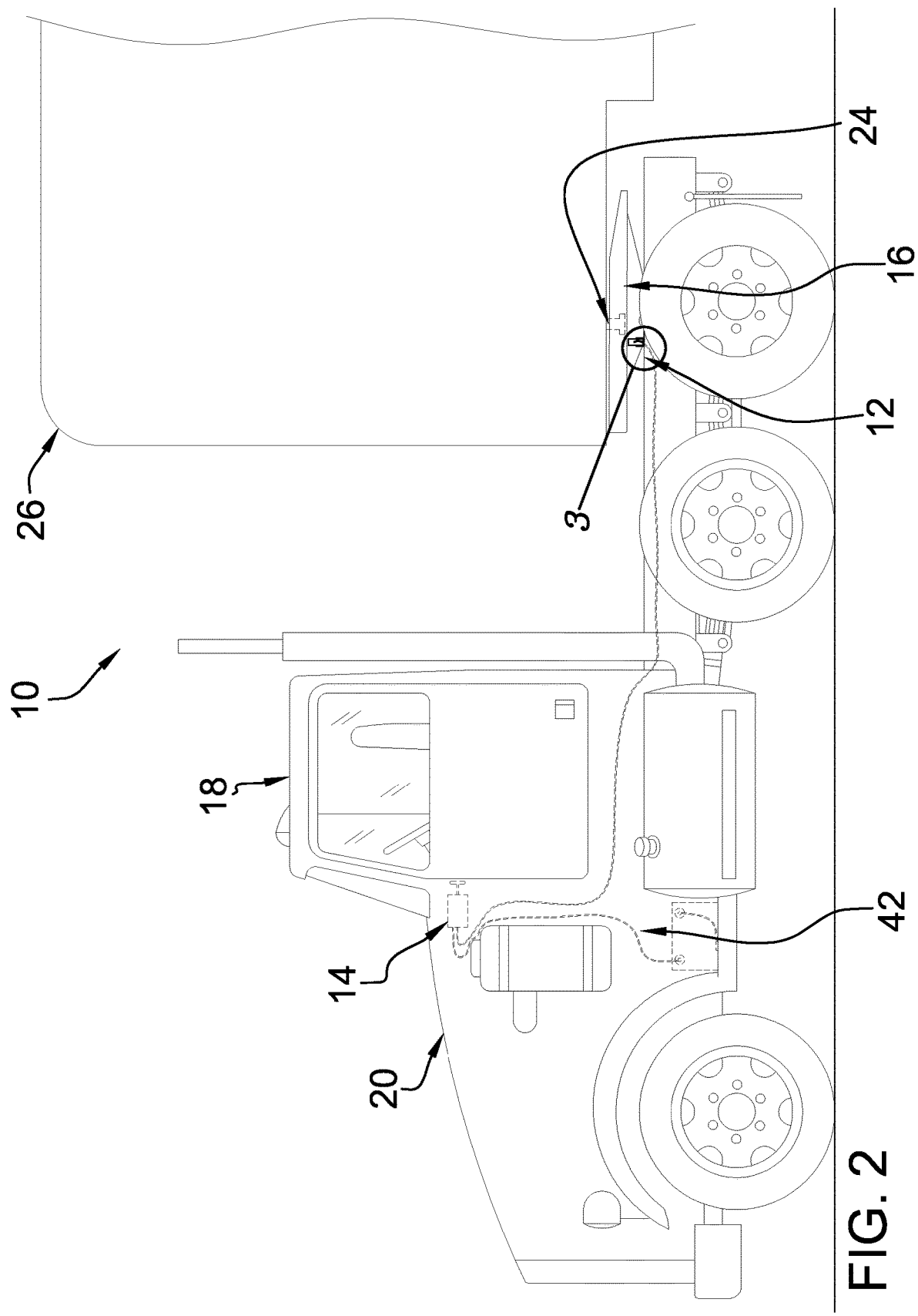
FIG. 2 is a side view of an embodiment of the disclosure.
Figure 3:
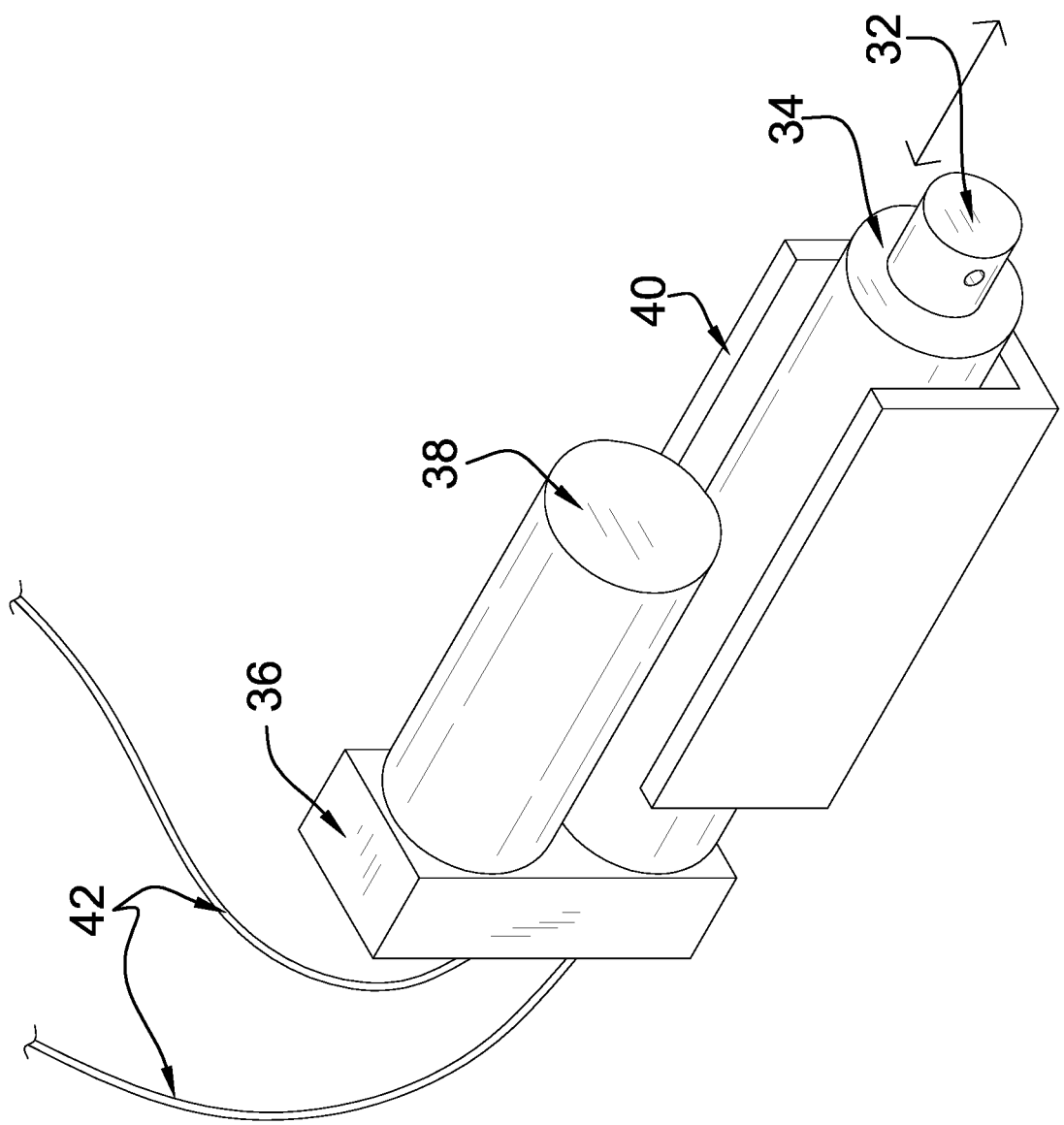
FIG. 3 is a detail view of an embodiment of the disclosure.

With reference now to the drawings, and in particular to FIGS. 1 through 3 thereof, a new trailer release device embodying the principles and concepts of an embodiment of the disclosure and generally designated by the reference numeral 10 will be described.

As best illustrated in FIGS. 1 through 3, the emergency trailer release device 10 generally comprises an actuating module 12 and a controller 14 configured to be mountable to a fifth wheel 16 and within a cab 18 of a towing truck 20, respectively. The actuating module 12 is operationally engaged to a set of locks 22 of the fifth wheel 16 and thus is configured to selectively open the set of locks 22 so that a king pin 24 of a trailer 26 engaged to the fifth wheel 16 by the set of locks 22 is released.

The actuating module 12 comprises a linear actuator 28, which may be electrically powered, hydraulically powered, or the like. The linear actuator 28 is rated for a maximum thrust force of between 2,000 and 100,000 pounds. As shown in FIG. 1, the linear actuator 28 is oppmbingly positioned relative to a manual release arm 30 engaged to the set of locks 22.

As shown in FIG. 3, the linear actuator 28 comprises a piston 32, which is positioned in and selectively extensible from a cylinder 34. A gear box 36 is operationally engaged to the piston 32 and to an electric motor 38 so that the electric motor 38 is positioned to selectively extend the piston 32 from the cylinder 34. The linear actuator 28 is configured to selectively open the set of locks 22 to release the king pin 24.

A bracket 40 is engaged to the cylinder 34, as shown in FIG. 3, and is configured to be mountable to the fifth wheel 16 of the towing truck 20 so that the linear actuator 28 is mounted to the fifth wheel 16 with the piston 32 positioned to selectively actuate the set of locks 22.

The controller 14 is operationally engaged to the actuating module 12 and is configured to operationally engage an electrical circuit 42 of the towing truck 20, as shown in FIG. 2. The controller 14 is configured to be selectively actuated by a driver of the towing truck 20 in an emergency situation. The controller 14 is positioned to signal the actuating module 12 to open the set of locks 22 to disengage the trailer 26 from the towing truck 20.

The controller 14 comprises a switch 44, which is configured to be selectively switched by the driver of the towing truck 20 to disengage the trailer 26 from the towing truck 20. The switch 44 may comprise a push knob 46, or other switching means, such as, but not limited to, toggles, levers, or the like. The push knob 46 is configured to be depressed by the driver of the towing truck 20 to disengage the trailer 26 from the towing truck 20.

In use, the device 10 enables a driver to disengage a trailer 26 from a towing truck 20 in an emergency situation by simply depressing the push knob 46, which signals the linear actuator 28 to open the set of locks 22, causing the king pin 24 to be released and the trailer 26 to disengage from the towing truck 20. For example, the driver may encounter situations wherein the towing truck 20, the trailer 26, or both, are in danger of rolling over. The driver also may encounter situations wherein the towing truck 20 and trailer 26 are in danger of jackknifing.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An emergency trailer release device comprising:
   an actuating module configured to be mountable to a fifth wheel of a towing truck, such that the actuating module is operationally engaged to a set of locks of the fifth wheel, wherein the actuating module is configured for selectively opening the set of locks, such that a king pin of a trailer engaged to the fifth wheel by the set of locks is released, wherein the actuating module comprises a linear actuator;
   a controller configured to be mountable to the towing truck within a cab thereof, the controller being operationally engaged to the actuating module and being configured for operationally engaging an electrical circuit of the towing truck, wherein the controller is configured for being selectively actuated by a driver of the towing truck in an emergency situation, such that the controller is positioned for signaling the actuating module for opening the set of locks for disengaging the trailer from the towing truck; and
   wherein the linear actuator comprises
      a cylinder,
      a piston positioned in and selectively extensible from the cylinder,
      a gear box operationally engaged to the piston, and
      an electric motor operationally engaged to the gear box, such that the electric motor is positioned for selectively extending the piston from the cylinder, wherein the linear actuator is configured for selectively opening the set of locks for releasing the king pin.

2. The emergency trailer release device of claim 1, wherein the linear actuator is electrically powered.

3. The emergency trailer release device of claim 1, wherein the linear actuator is rated for a maximum thrust force of between 2,000 and 100,000 pounds.

4. The emergency trailer release device of claim 1, wherein the linear actuator is opposingly positioned relative to a manual release arm engaged to the set of locks.

5. The emergency trailer release device of claim 1, further including a bracket engaged to the cylinder and being configured to be mountable to the fifth wheel of the towing truck, such that the linear actuator is mounted to the fifth wheel with the piston being positioned for selectively actuating the set of locks.

6. The emergency trailer release device of claim 1, wherein the controller comprises a switch, wherein the switch is configured for being selectively switched by the driver of the towing truck for disengaging the trailer from the towing truck.

7. The emergency trailer release device of claim 6, wherein the switch comprises a push knob, wherein the push knob is configured for being depressed by the driver of the towing truck for disengaging the trailer from the towing truck.

8. An emergency trailer release system comprising:
   a towing truck comprising a fifth wheel and a cab, the fifth wheel comprising a set of locks;
   a trailer comprising a king pin positioned for selectively engaging the set of locks for engaging the trailer to the towing truck;
   an actuating module mounted to the fifth wheel, such that the actuating module is operationally engaged to a set of locks of the fifth wheel, such that the actuating module is positioned for selectively opening the set of locks for releasing the king pin from the set of locks, wherein the actuating module comprises a linear actuator;
   a controller mounted to the towing truck within the cab, the controller being operationally engaged to the actuating module and an electrical circuit of the towing truck, wherein the controller is configured for being selectively actuated by a driver of the towing truck in an emergency situation, such that the controller is positioned for signaling the actuating module for opening the set of locks for disengaging the trailer from the towing truck; and wherein the linear actuator comprises
a cylinder,
a piston positioned in and selectively extensible from the cylinder,
a gear box operationally engaged to the piston, and
an electric motor operationally engaged to the gear box, such that the electric motor is positioned for selectively extending the piston from the cylinder, such that the linear actuator is positioned for selectively opening the set of locks for releasing the king pin.

9. The emergency trailer release system of claim 8, wherein the linear actuator is electrically powered.

10. The emergency trailer release system of claim 8, wherein the linear actuator is rated for a maximum thrust force of between 2,000 and 100,000 pounds.

11. The emergency trailer release system of claim 8, wherein the linear actuator is oppositely positioned relative to a manual release arm engaged to the set of locks.

12. The emergency trailer release system of claim 8, further including a bracket engaged to the cylinder and the fifth wheel, such that the linear actuator is mounted to the fifth wheel with the piston being positioned for selectively actuating the set of locks.

13. The emergency trailer release system of claim 8, wherein the controller comprises a switch, wherein the switch is configured for being selectively switched by the driver of the towing truck for disengaging the trailer from the towing truck.

14. The emergency trailer release system of claim 13, wherein the switch comprises a push knob, wherein the push knob is configured for being depressed by the driver of the towing truck for disengaging the trailer from the towing truck.

15. An emergency trailer release device comprising:
an actuating module configured to be mountable to a fifth wheel of a towing truck, such that the actuating module is operationally engaged to a set of locks of the fifth wheel, wherein the actuating module is configured for selectively opening the set of locks, such that a king pin of a trailer engaged to the fifth wheel by the set of locks is released, the actuating module comprising a linear actuator, the linear actuator being electrically powered, the linear actuator being rated for a maximum thrust force of between 2,000 and 100,000 pounds, the linear actuator being oppositely positioned relative to a manual release arm engaged to the set of locks, the linear actuator comprising:
a cylinder,
a piston positioned in and selectively extensible from the cylinder,
a gear box operationally engaged to the piston, and
an electric motor operationally engaged to the gear box, such that the electric motor is positioned for selectively extending the piston from the cylinder, wherein the linear actuator is configured for selectively opening the set of locks for releasing the king pin;
a bracket engaged to the cylinder and being configured to be mountable to the fifth wheel of the towing truck, such that the linear actuator is mounted to the fifth wheel with the piston being positioned for selectively actuating the set of locks; and
a controller configured to be mountable to the towing truck within a cab thereof, the controller being operationally engaged to the actuating module and being configured for operationally engaging an electrical circuit of the towing truck, wherein the controller is configured for being selectively actuated by a driver of the towing truck in an emergency situation, such that the controller is positioned for signaling the actuating module for opening the set of locks for disengaging the trailer from the towing truck, the controller comprising a switch, wherein the switch is configured for being selectively switched by the driver of the towing truck for disengaging the trailer from the towing truck, the switch comprising a push knob, wherein the push knob is configured for being depressed by the driver of the towing truck for disengaging the trailer from the towing truck.

* * * * *